United States Patent [19]
Zirngibl et al.

[11] 3,727,378
[45] Apr. 17, 1973

[54] PROCESS FOR COOLING HOT GAS/SOLIDS SUSPENSIONS

[75] Inventors: Hans Zirngibl, Duisburg; Klemens Jaschinski, Krefeld-Uerdingen; Karl Brandle, Krefeld; Walter Weidmann, Duisburg-Muendelheim, all of Germany

[73] Assignee: Farbenfabriken Bayer Aktiengesellschaft, Leverkusen, Germany

[22] Filed: Jan. 15, 1971

[21] Appl. No.: 106,758

[30] Foreign Application Priority Data

Feb. 4, 1970 Germany....................P 20 05 011.7

[52] U.S. Cl. ....................................................55/72
[51] Int. Cl. ..............................................B01d 57/00
[58] Field of Search...................55/71, 72; 23/87 T, 23/202 V

[56] References Cited

UNITED STATES PATENTS

| 3,078,148 | 2/1963 | Belknap et al.............. | 23/202 V |
|---|---|---|---|
| 3,406,012 | 10/1968 | Rahn.......................... | 23/202 V |
| 3,498,757 | 3/1970 | Allen........................... | 55/71 |
| 3,363,980 | 1/1968 | Krinov........................ | 23/202 V |
| 3,214,284 | 10/1965 | Wilson........................ | 23/202 V |

Primary Examiner—Charles N. Hart
Attorney—Burgess, Dinklage & Sprung

[57] ABSTRACT

A hot gas/solids suspension, of the kind formed during the reaction between gaseous metal halides and gases containing oxygen, is cooled by introduction of cold gas either radially or annularly. The suspension, flowing through a pipe at about 10 to 100 meters per minute, passes into a cylindrical chamber where its direction of flow is changed abruptly to produce turbulence and its flow rate is reduced to less than one-half its previous level. The direction of flow of the suspension is then abruptly changed again, the chamber discharging into a pipe so that the flow rate is increased. Means are provided to scrape away any solids which may deposit in the chamber.

In this manner the cooling is controlled which, in turn, controls the form of the solids.

9 Claims, 3 Drawing Figures

2'-2'

INVENTORS:
HANS ZIRNGIBL, KLEMENS JASCHINSKI, KARL BRÄNDLE, WALTER WEIDMANN.

PROCESS FOR COOLING HOT GAS/SOLIDS SUSPENSIONS

This invention relates to a process for cooling hot gas/solids suspensions with cold gases, and to an apparatus suitable for carrying out this process.

In reactions for the production of finely divided solids in the gas phase, gas/solids suspensions leave the reactor at temperatures far in excess of 1000°C. The mixture has to be cooled before the solids component is separated off. Cooling has proved to be particularly necessary in the production of metal oxides or semimetal oxides, for example $TiO_2$, $Al_2O_3$ and $SiO_2$, which can be used as pigments. When gradually cooled, these hot oxides show a marked tendency to adhere to the walls and form coatings. This can continue to such an extent that the pipe lines become increasingly narrower until finally they are completely obstructed and production has to be suspended.

In addition, in the production of oxidic pigments such as $TiO_2$, for example, the properties of the pigments are influenced to a large extent by the cooling program. If $TiO_2$ particles produced in this way remain too long in the high temperature zone, the particles undergo undesired, irregular growth into coarse material whose optical properties, for example brightening power, have deteriorated to a considerable extent. The increase in the size of the pigment particles is accompanied by a widening of the particle size distribution which also has a negative influence on the pigment properties. Accordingly, the product stream, after leaving the reactor at temperatures in excess of 1000°C, has to be cooled as quickly as possible to temperatures of 800°C or lower.

If by contrast the residence time in the high temperature zone is too short, in other words if the particles are cooled or chilled too quickly, a small desirable particle size can be maintained in some cases, although in the production of $TiO_2$, for example, rutile formation may then be inadequate. Another damage of over-rapid chilling is that the particles obtained are highly disturbed in their crystal structure, with the result that they have a lower stability to light.

Various proposals have already been put forward with a view to solving these problems. For example, U.S. Pat. Specification No. 2,394,633 relates to a process in which the product gas stream is quickly cooled to a temperature of from 450° to 800°C without any special precautionary measures, and the oxidic material subsequently deposited.

According to U.S. Pat. Specification No. 2,488,439, the product gas stream in the production of $TiO_2$ (chlorine with small quantities of oxygen) is cooled very quickly to 600°C by recycling cold end gas.

According to U.S. Pat. Specification No. 2,508,272, which also relates to the production of $TiO_2$, the product is similarly cooled as quickly as possible with cold recycle gas.

Finally, reference is made to the process disclosed in U.S. Pat. Specification No. 2,833,627 in which the $TiO_2$ suspension leaving the furnace at a temperature of about 1300°C is passed through a water-cooled aluminum pipe following the addition of cooled, dust-free recycled gas, and is cooled in this tube to from about 1000°C to 100°C.

All the processes referred to above have certain disadvantages. Thus, the cold gas is piped without any special precautionary measures. The mixing operation is not controlled in any way. Poor admixture is accompanied by the formation of strands, resulting in delayed or nonuniform temperature equalization. In some cases, uncontrolled flow cycles can result in re-admixture movements which can react back to the flame. Similarly, pressure can be subjected to periodic fluctuations. The result of these various phenomena are the aforementioned negative effects upon the pigment such as, for example, wide particle size distribution or poor habit development of the particles with numerous faults as a result of excessive chilling.

It is accordingly an object of the invention to provide a cooling process and apparatus which are substantially trouble-free and which permit close control over the form of the solids ultimately recovered.

These and other objects and advantages are realized in accordance with the present invention.

A process for cooling gas/solids suspensions of the kind formed during the reaction of a metal halide with a gas containing oxygen in the gas phase by mixing the gas/solids suspension with cold gas wherein cold gas is delivered to the reaction gas through nozzles or annular gaps, the resulting gas/solids stream is delivered with a change in direction to reduce the rate of flow into a widening chamber on whose walls the development of deposits is mechanically prevented, after which the gas/solids stream is delivered with another change in direction through a pipe of narrowed cross-section to the gas/solids separation stage.

The object of the present invention is to control the cooling operation. It should be neither too quick nor too slow, strand formation should be avoided and the temperature should be equalized over a predetermined distance. Surprisingly, it has been found that the problem can be solved if, following introduction of the cold gas, the product stream is made to undergo an abrupt change in direction and the rate of flow of the suspension simultaneously reduced to a considerable extent. The product stream is preferably deflected through approximately 90° into a vastly wider chamber. The turbulence generated through this change in direction and the considerable decrease in the rate of flow together produce complete temperature equalization. The product stream of uniform temperature then undergoes a second change in direction, again preferably through about 90°, and is finally delivered to an arrangement in which the solids component is separated from the gas. Surprisingly, the second change in direction and the drastic change in the rate of flow together additionally produce a coagulating effect. The at least partly coagulated product can subsequently be deposited with much greater effect.

The process according to the invention can be carried out as follows: A gas/solids suspension leaving the reactor at temperatures of from about 1000° to 1400°C and moving at a velocity of from about 10 to 100 meters per sound, is admixed with cold gas. The gas/solids mixture is then delivered with a change in direction to reduce its rate of flow into a vastly widening chamber. During the change in direction and entry into the vastly widening chamber, the rate of flow of the product stream falls to at least half and in some cases even to one twentieth of the original flow rate. In the deflection chamber, the temperature of the gas/solids suspension is in the range from about 700° to 1000°C and preferably in the range from about 750° to 850°C. At the outlet end of the deflection zone, the temperature should reach or be below about 800°C. A temperature range of from about 500° to 800°C is preferred. The gas/solids stream is then subjected to another change in direction and delivered through a pipe of narrowed crosssection (in order to increase the rate of flow, preferably to about 30 to 200 percent of the level prevailing at the outlet end of the reactor) to the gas/solids separation arrangement.

Gases that are inert to the reaction may be used as the cold gas. In the production of oxides from the corresponding halides, it is of advantage to use the cold, dust-free recycle gas. A gas of this kind can consist, for example, of chlorine, $CO_2$ and traces of oxygen.

According to the invention, the cold gas is delivered to the hot solids suspension by introducing the cold gas into a water-cooled arrangement which comprises an annular duct and nozzles extending from this annular duct inside, preferably radially arranged, and in which, after it has been distributed in the aforementioned annular duct, the cold gas flows inwards through the nozzles and penetrates into the reaction product in the form of jets.

The cooling operation can be additionally influenced by inclining the cold gas nozzles. Where the nozzles are horizontally arranged, i.e., transversely of the product gas stream, the temperature of the product stream is rapidly lowered, although complete temperature equalization only takes place afterwards in the widened chamber after the change of direction. If by contrast the cold gas is guided parallel to the product stream (through nozzles directed parallel to the wall or through an annular gap), cooling only takes place in the peripheral zone. In this case, complete temperature equalization only takes place after the change of direction or deflection. This makes it possible to shorten of extend the high temperature zone and hence to influence the particle size and to some extent also the particle size distribution by suitably selecting the angle of inclination of the cold gas nozzles.

As a result of the sharp change in direction and the accompanying turbulence, solids are inevitably deposited upon the walls of the deflection chamber where they settle. Accordingly, there is provided in the widening chamber a rotatable frame which is provided with a cooling system and which rotates slowly and prevents excessive deposits or strips off any deposits that may have accumulated. This frame rotates very slowly at a peripheral speed of from about 0.01 to 0.7 meter per second.

The rotatable frame also prevents relatively large quantities of product from remaining too long in the high temperature zone in the form of deposits, as a result of which they would be deprived in time of their favorable optical properties.

Because it is water cooled, this rotatable frame can be made from metals which are resistant to the gas. In the production of $TiO_2$, aluminum or nickel is recommended. If the solids product emanating from the reaction is extremely hard, such as rutile for example, the aluminum will in time be eroded at those places where it scrapes off the product. To counteract this, it is advisable to provide hard materials at the endangered areas. For example, hardened metal strips or strips of a resistant ceramic material such as aluminum oxide or steatite for example can be applied.

The process according to the invention and the apparatus in which it is carried out are described in the following with reference to FIGS. 1 to 3 of the accompanying drawings where in:

Figure 1:
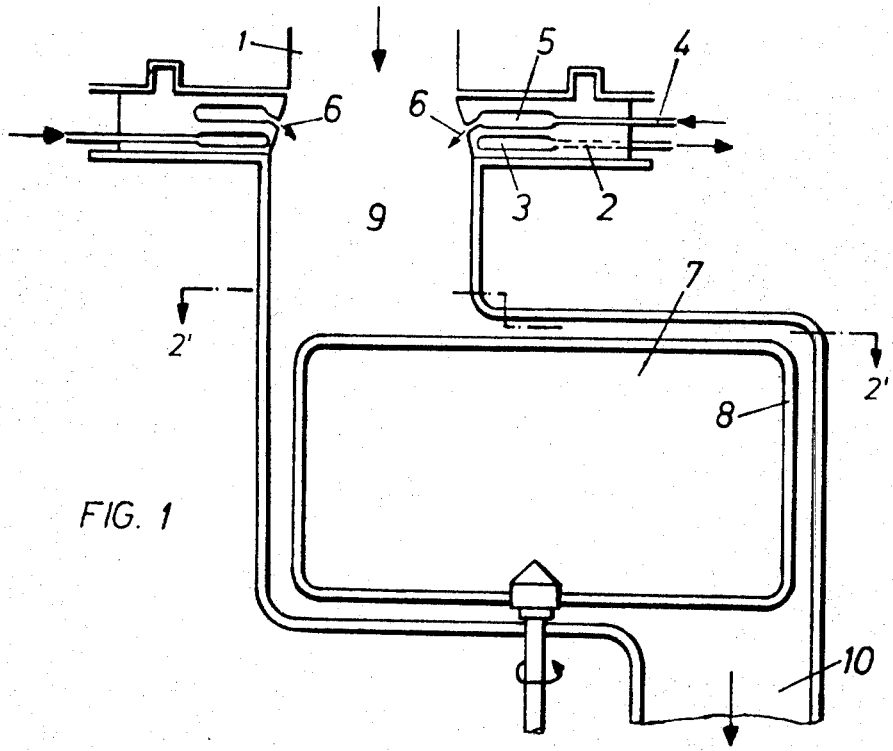
FIG. 1 is a schematic, longitudinal section through the apparatus.
Figure 2:
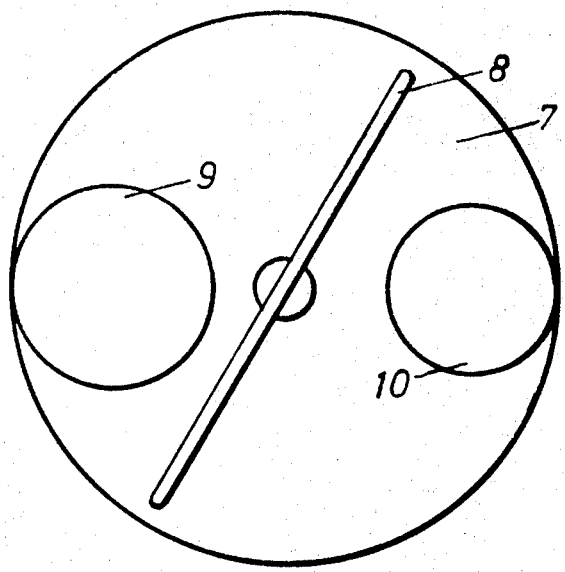
FIG. 2 is a section on line 2—2 of FIG. 1.

Referring now more particularly to the drawings, in FIG. 1, the hot gas/solids suspension leaves the actual reactor in which the solids component is formed at 1. A plate 2, preferably made of metal, which is provided with a water cooling system 3 and which is used to deliver the cold gas is inserted into the reactor. The cold gas is introduced through the socket 4, distributed over the periphery in the annular duct 5 and introduced radially through the nozzles 6 into the product stream. There then follows an apparatus section made of water-cooled metal, which consists of a large cylindrical chamber 7 which is fitted with a rotatable, water-cooled frame 8 and which has one cylindrical inlet 9 and one cylindrical outlet 10 for the gas/solids suspension. The inlets and outlets are arranged opposite one another (see FIG.2) on the periphery of the large chamber and extend in opposite directions. The product is further cooled and deposited after passing through the outlet 10.

Figure 3:
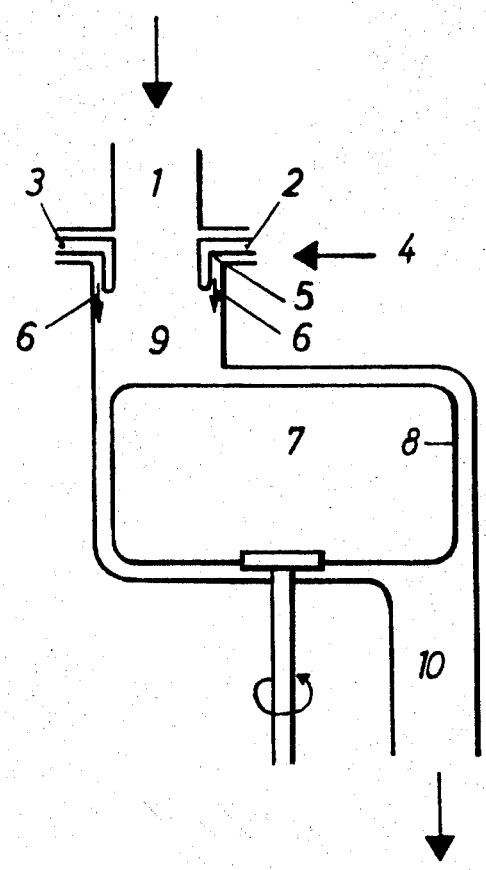
FIG. 3 shows another embodiment differing from FIG. 1 in the delivery of the cooling gas.

The embodiment of FIG. 3 differs in that the cooling gas is discharged through an annular gap 6' so that it moves parallel to the hot gas.

The process according to the invention is suitable for cooling any gas/solids suspensions of the kind formed in gas-phase reactions. Above all, it can be used with particular advantage in the production of pigments by the gas-phase decompositon of metal halides, for example the chlorides of Ti, Si, Zr, Cr, Al, Fe or Zn, with gases containing oxygen at elevated temperatures.

The invention is illustrated by the following Example which describes the production of finely divided pigment $TiO_2$.

EXAMPLE

The apparatus used for the process corresponds to that illustrated in FIG. 1. The outlet from the reactor 1 had a diameter of 190 mm. The dimensons of the large, widened chamber in which the changes in direction take place were as follows:

The internal diameter of the chamber 1 was 679 mm, and the internal height 350 mm. The rotatable frame had an outer diameter of 630 mm. The frame rotates at a speed of 5 rpm corresponding to a peripheral speed of approximately 0.2 meter per second.

$TiCl_4$ vapor at a temperature of 500°C to which aluminium chloride vapour had been added was reacted with a hot gas stream of oxygen and $CO_2$ in the reactor.

On completion of the reaction, the following mixture issued from the reactor at 1: 244 $Nm^3/h$ reaction gas with 200 kg/h $TiO_2$. The gas contained 77.0 percent by volume of chlorine, 12.6 percent by volume of $CO_2$ and 10.4 percent by volume of $O_2$.

180 Nm³/h of the cold gas were introduced through the plate 2 in order to cool the reaction product. The gas was introduced into the product gas stream through the nozzles 6.

This mixture entered the cylindrical chamber 7 in which complete temperature equalization took place. The temperature stabilized at 760°C. The cooled reaction mixture left the arrangement at 10 whose diameter was 80 mm, after which it was delivered to another cooling and wet-disposition arrangement and the $TiO_2$ formed collection in an aqueous suspension of pigment. The solids component was filtered off and washed, dried and ground.

The $TiO_2$ pigment obtained had the following properties:

| | |
|---|---|
| Brightening power according to DIN 62 193 | 860 |
| Reynolds number | 1950 |
| Most frequent volume diameter | 0.231 μ |
| ≈g (distribution width) | 1.37 |

The pigment particle fraction larger than 0.25 μ amounted to 2 percent and the proportions of particles smaller than 0.18 μ amounted to approximately 3 percent. These figures were obtained by counting from photographs taken with an electron microscope.

The test was stopped after 3 days. No disturbances in the production of the pigment were recorded over this period. The pigment properties were highly constant. The large deflection chamber was examined after the test. There were no signs of any appreciable deposits. The apparatus had remained completely free from obstruction during the entire test, nor were any appreciable pressure differences noticed during the test.

By way of comparison, another test was carried out, corresponding in its details to the test described above, the only difference being that on this occasion the two changes in direction were avoided. The cold gas was introduced at 6, as shown in the drawing, and after a certain distance (without any change in direction), the pigment was completely cooled and deposited.

The product obtained had the following properties:

| | |
|---|---|
| Brightening power according to DIN 62 193 | 790 |
| Reynolds number | 1725 |
| Most frequent volume diameter | 0.224 μ |
| ≈g (distribution width) | 1.58 |

It will be appreciated that the instant specification and examples are set forth by way of illustration and not limitation, and that various modifications and changes may be made without departing from the spirit and scope of the present invention.

What is claimed is:

1. In the process for cooling gas/solids suspensions of the kind formed during the reaction of metal halides with gases containing oxygen wherein the gas/solids suspension is mixed with cold gas and then treated for separation of solids, the improvement which comprises abruptly changing the direction of flow of the mixture of cold gas and gas/solids suspension, reducing its rate of flow, abruptly changing its direction of flow a second time, and increasing its rate of flow, whereby cooling is effected quickly and uniformly.

2. A process as claimed in claim 1, wherein the cooled gas ultimately separated from the solids is used as the cold gas.

3. A process as claimed in claim 1, wherein the gas/solids stream initially flows at a rate of about 10 to 100 meters per second, its rate of flow is reduced by a factor of about 2 to 20 and its rate of flow is thereafter increased again.

4. A process as claimed in claim 1, wherein the gas/solids stream initially flows at a rate of about 10 to 100 meters per second, its rate of flow is reduced by a factor of about 2 to 20, and its rate of flow is thereafter increased to about 30 to 200 percent of its initial rate.

5. A process as claimed in claim 1, wherein the temperature of the gas/solids suspension on leaving the zone of low flow rate is in the range from about 500° to 800°C.

6. A process as claimed in claim 1, wherein the cold gas is discharged into the flowing gas/solids suspension substantially radially so as to effect rapid cooling.

7. A process as claimed in claim 1, wherein the cold gas is discharged annularly about the flowing gas/solids suspension so as to effect relatively slow cooling.

8. A process as claimed in claim 1, wherein the gas/solids suspension comprises chlorine, oxygen and optionally carbon dioxide as the gas and the oxide of at least one of titanium, silicon, zirconium, chromium, aluminium, iron and zinc as the solids.

9. A process as claimed in claim 8, wherein the cooled gas ultimately separated from the solids is used as the cold gas, the gas/solids stream initially flows at a rate of about 10 to 100 meters per second, its rate of flow is reduced by a factor of about 2 to 20 and its temperature is reduced to about 500° to 800°C., and its rate of flow is thereafter increased to about 30 to 200 percent of its initial rate, any solids deposited in the zone of low flow rate being continuously scraped away.

* * * * *